United States Patent [19]

Vanderlaan

[11] Patent Number: 5,256,751
[45] Date of Patent: Oct. 26, 1993

[54] OPHTHALMIC LENS POLYMER INCORPORATING ACYCLIC MONOMER

[75] Inventor: Douglas G. Vanderlaan, Jacksonville, Fla.

[73] Assignee: Vistakon, Inc., Jacksonville, Fla.

[21] Appl. No.: 14,903

[22] Filed: Feb. 8, 1993

[51] Int. Cl.$^5$ .............................. C08F 20/58
[52] U.S. Cl. ........................ 526/304; 526/320
[58] Field of Search ..................... 526/304, 320

[56] References Cited

U.S. PATENT DOCUMENTS

| | | | |
|---|---|---|---|
| 2,508,718 | 5/1950 | Jones | 526/304 |
| 2,776,951 | 1/1957 | Melaned | 526/304 |
| 3,531,525 | 9/1970 | Hoke et al. | 526/304 |
| 3,671,502 | 6/1972 | Semour et al. | 526/304 |
| 3,696,063 | 10/1972 | Mott et al. | 526/304 |
| 3,766,112 | 10/1973 | Blackford, Jr. | 526/304 |
| 3,766,144 | 10/1973 | Hudson et al. | 526/304 |
| 3,813,447 | 5/1974 | Tanaka et al. | 526/304 |
| 3,983,083 | 9/1976 | Kaetsu et al. | 526/240 |
| 4,038,264 | 7/1977 | Rostoker et al. | |
| 4,138,541 | 2/1979 | Cenci et al. | 526/304 |
| 4,152,508 | 5/1979 | Ellis et al. | |
| 4,543,371 | 9/1985 | Gallop et al. | 524/548 |
| 5,006,622 | 4/1991 | Kunzler et al. | 526/309 |
| 5,116,922 | 5/1992 | Sundararaman et al. | 526/304 |

FOREIGN PATENT DOCUMENTS

| | | | |
|---|---|---|---|
| 0434438 | 6/1991 | European Pat. Off. | 526/304 |
| WO92/97885 | 5/1992 | PCT Int'l Appl. | |
| 2202857 | 10/1988 | United Kingdom | 526/304 |

OTHER PUBLICATIONS

J. Junzler, G. Friends, R. Ozark & J. McGee, Polym. Mater, Sci. Eng. 1991, pp. 239-240.

G. Friends & J. Kunzler, Polym. Mater. Sci. Eng. 1990, pp. 809-813.

*Primary Examiner*—Joseph L. Schofer
*Assistant Examiner*—N. Sarofim
*Attorney, Agent, or Firm*—Matthew S. Goodwin

[57] ABSTRACT

A polymer composition composed of the reaction product of a hydrophilic monomer and an acyclic monomer is disclosed. The preferred hydrophilic monomer is hydroxyethyl methacrylamide (HMA), and the preferred acyclic monomer is hydroxyoctyl methacrylate (HOMA). The monomeric components can be polymerized in a polystyrene mold to make contact lenses, and when swollen with water, are suitable for use as soft hydrogel contact lenses.

The preferred compositions also include a zwitterionic monomer, such as a sulfobetaine, and a crosslinking agent, such as ethyleneglycol dimethacrylate (EGDMA).

Hydrogel contact lenses made from these polymers exhibit high water content and mechanical strength, and are compatible with polystyrene molds.

14 Claims, No Drawings

OPHTHALMIC LENS POLYMER INCORPORATING ACYCLIC MONOMER

BACKGROUND OF THE INVENTION

This invention relates to a polymer derived from the reaction of hydrophilic monomeric components. More specifically, it relates to such a polymer incorporating an acyclic monomeric component especially adapted for use in the preparation of ophthalmic lenses, particularly soft hydrogel contact lenses.

The fabrication of thin hydrogel contact lenses with high water contents is one of the driving forces behind new developments in the ophthalmic art. Lenses with high water contents provide the cornea of the wearer with the oxygen it needs to maintain normal metabolism. Thus, a high degree of patient comfort can be obtained even though the lens may remain intact on the cornea for extended periods of time.

Unfortunately, high water content hydrogels are generally characterized by poor mechanical properties. This means that thin contact lenses made from these high water content hydrogels have poor mechanical properties, and therefore are very difficult to handle. It has therefore been desirable to develop high water content hydrogels, which have good mechanical properties. Unfortunately, these two properties are often inconsistent with one another.

One known method for improving the mechanical toughness of hydrogel lenses is to add monomers with hydrophobic character to the polymerization reaction mixture from which the lens is derived. Such monomers include lauryl methacrylate. Hydrophobic monomers tend to reduce the equilibrium water content, and thus the oxygen permeability of hydrogel polymers. This in turn causes an associated increase in patient discomfort and corneal swelling when the lens is placed on the cornea for extended periods of time.

The water content of the lens can be increased by the addition of highly hydrophilic monomers; however, there are two drawbacks associated with this remedy. The use of anionic monomers such as methacrylic acid results in hydrogels with high affinities for certain proteins, e.g. lysozyme. Alternatively, the addition of nonionic hydrophilic monomers such as N,N-dimethylacrylamide (DMA) or N-vinylpyrrolidinone (NVP) can cause the resulting monomer blend to dissolve polystyrene. This factor is significant because it is often desirable to use polystyrene molds to form lenses.

Accordingly, interesting attempts have been made to develop hydrogels with high water content, good mechanical properties, and acceptable compatibility with polystyrene molds. For example, U.S. Pat. No. 5,006,622 discloses soft hydrogel contact lenses prepared from the reaction product of a branched alkylhydroxy cycloalkyl acrylate, and a hydrophilic monomer, such as hydroxyethyl methacrylate (HEMA). Further studies of these hydrogel systems can be found in J. Kunzler, G. Friends, R. Ozark and J. McGee, Polym. Mater. Sci. Eng. 1991, pp. 239-240; and G. Friends and J. Kunzler, Polym. Mater. Sci. Eng. 1990, pp. 809-813. Although the water contents and physical properties of these lenses are reported to be promising, the complexity of steps necessary to synthesize the cycloalkyl acrylate is too unduly burdensome to be of any value.

Another attempt is disclosed in U.S. Pat. No. 3,983,083. This patent discloses a soft contact lens composed of an hydroxyalkyl methacrylate and another hydrophilic monomer. However, this lens composition fails to achieve the overall balance of properties desired for straightforward manufacture and acceptable wear characteristics.

In view of the deficiencies of the prior art, it would be beneficial to develop a polymer system for the manufacture of ophthalmic lenses, especially hydrogel contact lenses. More specifically, it would be especially advantageous to prepare soft hydrogel contact lenses from a hydrogel polymer system characterized by a high water content, good mechanical properties, and acceptable compatibility of the monomeric components with polystyrene.

SUMMARY OF THE INVENTION

In one aspect, the invention is a polymer. The polymer comprises the reaction product of a hydrophilic monomer and an acyclic monomer represented by the following formula:

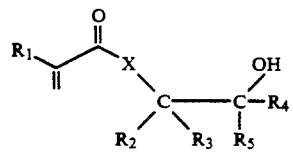

Wherein
$R_1$ is hydrogen or methyl;

each of $R_2$, $R_3$, $R_4$ and $R_5$ is an acyclic monovalent alkyl radical, provided the total number of carbon atoms of $R_2+R_3+R_4+R_5$ is between 4-20, inclusive;

X is O, NH or $NR_6$; and $R_6$ is a straight or branched alkyl radical.

In another aspect, the invention is an ophthalmic lens. The ophthalmic lens comprises the polymer described above.

The monomeric components which make up the polymer of this invention are compatible with polystyrene molds, so that polystyrene molds can advantageously be used to form ophthalmic lenses, particularly contact lenses. Lenses made from the polymer of this invention, when swollen with water, are hydrogels characterized by high water content and good mechanical properties.

In contrast to the prior art, the starting monomeric materials are relatively inexpensive and easy to prepare, and therefore this invention is realistically practicable. In addition, the elongation at break of soft hydrogel contact lenses made from the polymer are higher relative to lenses made from an analogous polymer which substitutes an equivalent cyclic monomer for the acyclic monomer described in the formula above.

The polymer of this invention can be used for any application which can benefit from the optimum balance of properties it offers. Advantageously, the polymer is used for biomedical applications, particularly for the fabrication of ophthalmic lenses, such as soft hydrogel contact lenses.

DETAILED DESCRIPTION OF THE INVENTION

One of the monomeric components of the polymer is an acyclic monomer represented by the following formula:

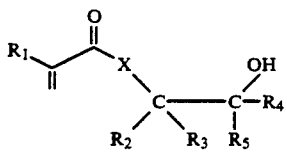

Wherein $R_1$ is hydrogen or methyl;

each of $R_2$, $R_3$, $R_4$ and $R_5$ is an acyclic monovalent alkyl radical, provided the total number of carbon atoms of $R_2+R_3+R_4+R_5$ is between 4–20, inclusive;

X is O, NH or $NR_6$; and $R_6$ is a straight or branched alkyl radical.

Preferably, $R_1$ is methyl, and $R_3$ and $R_5$ are each hydrogen. In the preferred embodiment, X is O or NH. Preferably, X is O. The most preferred acyclic monomer is hydroxyoctyl methacrylate (HOMA), which is a mixture of the components represented as follows:

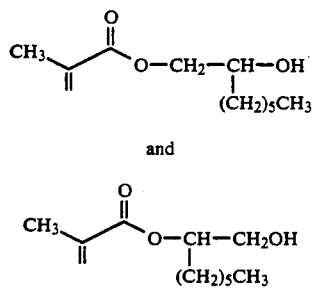

For the purpose of describing this invention, the class of monomers described in the formula above are referred to as the "acyclic monomer". The acyclic monomer and its preparation are described generally in A. Radugina, I. Bocharova, P. Matkovskii, V. Golubev and K. Brikenshtein, Izv. Akad. Nauk SSSR, Ser. Khim., (10), 2249–52 (1987). The preferred acyclic monomers can be prepared by reaction of acrylic or methacrylic acid with epoxides of acyclic alkenes or by reaction of the acid chlorides or anhydrides of acrylic or methacrylic acid with acyclic amino alcohols. The most preferred acyclic monomer, HOMA, can be prepared by reacting methyacrylic acid with 1,2-epoxyoctane in the presence of a catalyst at an elevated temperature.

For the purpose of defining this invention, a "hydrophilic monomer" refers to any monomer or mixture of monomers which, when polymerized, yields a hydrophilic polymer capable of forming a hydrogel when contacted with water. Examples of hydrophilic monomers include, but are not limited to, hydroxyesters of acrylic or methacrylic acid, methycrylic acid (MAA), hydroxyethyl methacrylamide (HMA), DMA, NVP, styrene sulphonic acid, and other hydrophilic monomers known in the art.

Examples of hydroxyesters of acrylic or methacrylic acid include HEMA, hydroxyethyl acrylate (HEA), glyceryl methacrylate, hydroxypropyl methacrylate, hydroxypropyl acrylate and hydroxytrimethylene acrylate. The preferred hydroxyester is HEMA.

The most preferred hydrophilic monomer is HMA.

The relative proportion of the monomeric components depends on numerous factors, for example, the specific monomeric components chosen, and the final properties of the polymer desired, and can be readily determined empirically. Generally, the weight ratio of the hydrophilic monomer to the acyclic monomer is between about 1:5:1 to about 9:1, preferably about 2:1 to about 4:1, more preferably about 2.5:1 to about 3.5:1. If the amount of the hydrophilic monomer were greater than about 90 percent, then the resultant polymer will not show good mechanical properties (strength). On the other hand, if the amount of the hydrophilic monomer were less than about 60 percent, then the water content and oxygen permeability of the resultant hydrogel polymer will not be sufficiently high.

In a particularly preferred embodiment of this invention, a zwitterionic monomer is added as a co-reactant in the monomer mixture, and the polymer comprises the reaction product of not only the hydrophilic and acyclic monomeric components, but also the zwitterionic monomer.

For the purpose of describing this invention, a zwitterionic monomer is any monomer containing a zwitterionic functional group. A zwitterionic functional group refers to a pendant group, bound to the backbone of the monomer, having at least one positive and at least one negative charge, preferably having one positive and one negative charge. An overall discussion of zwitterionic functionality can be reviewed in "Fundamentals of the Zwitterionic Hydrophilic Group" by R. G. Laughlin, *Langmuir*, pp. 842–847 (1991). Generally, zwitterionic functionality can be formed from a group containing both an acidic and a basic functionality such that when placed in conditions of appropriate pH, preferably a neutralized buffered saline solution, each of these functionalities exists in ionized form. Alternatively, the basic functionality can be substituted with certain positively charged functionalities for example, a quaternary ammonium salt.

Zwitterionic monomers within the scope of this invention are often referred to as "ampholytic" monomers and are described, for example, by J. S. Salamone and W. C. Rice, in Polyampholytes, Encyclopaedia of Polymer Science and Engineering, 2nd Ed., Vol. 11, H. F. Mark, N. M. Bikales, C. G. Overberger and G. Menges, eds., Wiley, New York, 1988. The preferred zwitterionic monomers are sulfobetaines, carboxybetaines, and other betaine monomers. Of these, the sulfobetaine monomers are most readily available and therefore are more preferred. Examples of suitable sulfobetaines include 1-(3-sulfopropyl-1)- 2-vinylpyridinium (SPV), N,N-dimethyl-N-[3-[(3-methyl-1-oxo-2-propenylamino]propy 1]-3-sulfo-1-propanaminium (SPP), and N-(3-sulfopropyl)-N-methacryloxyethyl-N,N-dimethyl ammonium betaine (SPE). The most preferred zwitterionic monomer is SPE because it possesses outstanding solubility characteristics in relation to the other monomeric components of the composition and also with respect to conventional diluents which are added either during or subsequent to polymerization. The outstanding solubility characteristics of SPE contribute significantly to the production of optically transparent lenses.

The incorporation of zwitterionic functionality is desired because hydrogel contact lenses made from polymers incorporating this monomeric component exhibit reduced water loss when the lens is transferred from its package onto the cornea of a wearer over extended periods of time. Not only does dehydration of the lens reduce its water content and hence results in a corresponding drop in patient comfort, but dehydration can markedly effect the physical properties of the lens as well as patient comfort. Specifically, dehydration can effect the refractive index, curvature and power of the lens, and may also place the patient at risk for corneal complications. The incorporation of the zwitterionic monomer eliminates or substantially reduces the risks associated with thermal dehydration of the lens.

The concentration of zwitterionic monomer in the polymerization reaction mixture is that concentration which eliminates or significantly reduces lens water loss during wear, and can readily be determined empirically. Generally, the amount of zwitterionic monomer is desirably within a range between about 5 to about 50 percent of the weight of the reactive monomeric components, preferably from about 20 to about 40 weight percent. If the amount of zwitterionic monomer were greater than about 50 percent, then a contact lens made from such a composition will in all likelihood exhibit poor mechanical properties and handling characteristics.

In another preferred embodiment, a crosslinking agent is added to the reactive monomeric components, and is chosen to be compatible with those components while increasing the dimensional stability of the finished polymer. Although numerous crosslinking agents can be used successfully in the practice of this invention, an example of a preferred crosslinking agent is ethyleneglycol dimethacrylate (EGDMA). The amount of crosslinking agent necessary to impart an increase in the dimensional stability of the lens can be readily determined empirically, and will depend to a large degree on the physical characteristics of the lens desired. Advantageously, the amount of crosslinker in the polymeric composition is between about 1.0 to about 15 mmoles per gram of the reactive components of the composition. Generally, if the amount of crosslinker is less than about 1.0 mmole per gram, then the desired dimensional stability of the lens, including the requisite rigidity or stiffness of the lens to retain its shape, is not obtained. If the concentration of crosslinker is greater than about 15 mmoles per gram, then as a practical matter the hydrogel lens may be too stiff and brittle for comfortable patient use. Preferably, the amount of crosslinker in the monomeric composition is between about 2.5 to about 10 mmole per gram.

It should be noted that some hydrophilic monomers such as HEMA and HMA typically contain small amounts of crosslinker.

The hydrophilic monomers are preferably copolymerized with comonomers in a monomer reaction mixture to impart specific improvements in chemical and physical properties, depending on the particular application desired. For example, the equilibrium water content of an ophthalmic lens can be increased if MAA is used as a comonomer. Similarly, other components may be added for specific applications, for example, to impart UV absorbent or tint properties to the finished lens.

The monomer reaction mixture also includes an initiator, usually from about 0.05 to 1 percent of a free radical initiator which is thermally activated. Typical examples of such initiators include lauroyl peroxide, benzoyl peroxide, isopropyl percarbonate, azobisisobutyronitrile and known redox systems such as the ammonium persulfate-sodium metabisulfite combination and the like. Irradiation by ultraviolet light, electron beam or a radioactive source may also be employed to initiate the polymerization reaction, optionally with the addition of a polymerization initiator, e.g. benzoin and its ethers, as well as charge transfer initiators such as benzophenone/amine systems known in the art.

The polymerization is carried out in admixture with all of the essential components and any other additional ingredients, if desired, in the presence or absence of an inert diluent. If the polymerization is carried out in the absence of a diluent the resulting polymeric composition can be formed, as for example by lathe cutting, into the desired lens shape, and then swollen with the requisite amount of water following this operation. Alternatively, and more preferably, the polymerization is carried out in the presence of an inert diluent. A commonly used inert diluent is a water-displaceable boric acid ester. The characteristics of desired boric acid esters as well as the preferred concentration of ester in the polymerization reaction mixture is described in detail in U.S. Pat. No. 4,680,336, which is incorporated by reference herein. However, the preferred inert diluent is glycerin because it provides for even more improved lens properties. The preferred methods for forming the desired lens when a diluent is used include centrifugal casting and cast molding, for example using molds described in U.S. Pat. No. 4,565,348, as well as combinations of these methods with the other methods described generally herein.

For purposes of describing this invention, an "ophthalmic lens" is any lens adapted for placement on the cornea or in the eye. Examples of such lenses include contact lenses, intraocular lenses, and corneal bandage lenses. The most preferred ophthalmic lens is a contact lens. The most preferred contact lens is a soft hydrogel lens. A hydrogel lens can be prepared by swelling the crosslinked polymer of this invention, which has been shaped in the form of the lens, with a significant amount of water.

The following examples set forth the most preferred embodiments of this invention. These examples are illustrative only, and should not be interpreted to limit the scope of this invention as set forth in the appended claims. Numerous additional embodiments within the scope and spirit of the claimed invention will become readily apparent to those skilled in the art upon a detailed review of this specification.

EXAMPLE 1

Hydroxyoctyl methacrylate (HOMA) is prepared by reacting 28.8 parts of methacrylic acid with 40.0 parts 1,2-epoxyoctane in the presence of 0.07 parts of tetramethylammonium chloride and 0.21 parts of hydroquinone monomethylether for 4 hours at 140° C. with $O_2$ bubbled through the reaction mixture. The product is distilled at 95°–110° C./0.4 mm to yield 46 grams of HOMA which was identified by IR and NMR.

EXAMPLE 2

A blend is made of 74 parts of HMA (made by reacting methacryloyl chloride with ethanolamine and containing a small amount of 2-methacrylamidoethyl methacrylate crosslinker), 26 parts of HOMA, 0.34 parts of $\alpha$-hydroxy-$\alpha$, $\alpha$-dimethylacetophonone (a UV active photoinitiator). 75 parts of this monomer blend is further combined with 25 parts glycerin (GLYC) diluent (monomer/diluent (M/D)=75/25) and cured by exposure to UV light in a two part polystryene mold to form a contact lens shape. The mold is opened and immersed in a 1:1 blend of ethanol and buffered saline for about one hour, and then transferred to a borate buffered saline solution.

Tensile properties are determined using an Instron TM model 1122 tensile tester. Water contents are determined gravimetrically and are expressed as:

$$\% \, EWC = \frac{(\text{mass of hydrated lens} - \text{mass of dry lens})}{\text{mass of hydrated lens}} \times 100$$

TABLE 1

PHYSICAL PROPERTIES OF SOFT HYDROGEL LENSES

| EXAMPLE | 2 | 3 | 4 | 5 |
|---|---|---|---|---|
| HMA % | 74 | 80 | 79.5 | 74.1 |
| HOMA % | 26 | 20 | 19.9 | 24.7 |
| SPE % | 0 | 0 | 0 | 0 |
| EGDMA % | 0 | 0 | 0.66 | 0.66 |
| MAA % | 0 | 0 | 0 | 0.59 |
| M/D | 75/25 | 75/25 | 75/25 | 75/23 |
| DILUENT | GLYC | GLYC | GLYC | GLYC |
| EWC, % | 63 | 76 | 67 | 64 |
| MODULUS, psi | 74 | 22 | 61 | 81 |
| ELONG. AT BREAK, % | 270 | 340 | 190 | 140 |
| TENSILE STR., psi | 104 | 46 | 78 | 72 |

EXAMPLES 3-5

Following the procedure of EXAMPLE 2 the additional compositions given in Table 1 are made and the properties of each determined. All of the lenses are optically clear.

EXAMPLES 6-25

The procedure of EXAMPLE 2 is followed, except using SPE obtained from Raschig Corporation, heating blends with stirring at 40° C. until dissolved, and filtering to remove any small particles before forming the lens. All of the lenses are optically clear. The compositions and resulting properties are given in Table 2. BDBAE refers to the boric acid ester of 1,4-butanediol.

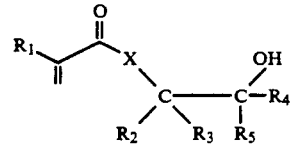

Wherein
$R_1$ is hydrogen or methyl;
each of $R_2$, $R_3$, $R_4$ and $R_5$ is hydrogen or an acyclic monovalent alkyl radical, provided the total number of carbon atoms of $R_2+R_3+R_4+R_5$ is between 4–20, inclusive;
X is O, NH or $NR_6$; and
$R_6$ is a straight or branched alkyl radical.

2. The polymer of claim 1 wherein R is methyl.

3. The polymer of claim 2 wherein $R_3$ and $R_5$ are each hydrogen.

4. The polymer of claim 2 wherein X is O or NH.

5. The polymer of claim 3 wherein X is O.

6. The polymer of claim 4 wherein the acyclic monomer is hydroxyoctyl methacrylate.

7. The polymer of claim 6 wherein the hydrophilic monomer is hydroxyoctyl methacrylate.

8. The polymer of claim 7 wherein the weight ratio of the hydrophilic monomer to the acyclic monomer is between about 1.5:1 to about 9:1.

9. The polymer of claim 7 wherein the weight ratio of the hydrophilic monomer to the acyclic monomer is between about 2 1 to about 4:1.

10. The polymer of claim 9 wherein the polymer further comprises the reaction product of a zwitterionic monomer.

11. The polymer of claim 10 wherein the zwitterionic monomer is a sulfobetaine monomer.

12. The polymer of claim 11 wherein the sulfobetaine

TABLE 2

PHYSICAL PROPERTIES OF SOFT HYDROGEL CONTACT LENSES

| EXAMPLE | 6 | 7 | 8 | 9 | 10 | 11 | 12 | 13 | 14 | 15 |
|---|---|---|---|---|---|---|---|---|---|---|
| HMA % | 57.5 | 56.9 | 57.2 | 57 | 64.8 | 56.8 | 51.3 | 67.4 | 66.6 | 56.7 |
| HOMA % | 20 | 19.8 | 20 | 19.8 | 22.6 | 19.7 | 24.8 | 20 | 20 | 30 |
| SPE % | 22.5 | 22.3 | 22.4 | 22.3 | 12.6 | 22.2 | 21.9 | 12 | 12 | 12 |
| EGDMA % | 0 | 1.04 | 0.44 | 0.88 | 0 | 1.27 | 1.26 | 0.6 | 0.6 | 1.3 |
| MMA % | 0 | 0 | 0 | 0 | 0 | 0 | 0.72 | 0 | 0.8 | 0 |
| M/D | 80/20 | 80/20 | 80/20 | 80/20 | 78/22 | 80/20 | 82.18 | 80/20 | 80/20 | 80/20 |
| DILUENT | GLYC | GLYC | GLYC | GLYC | GLYC | GLYC | GLYC | GLYC | GLYC | GLYC |
| EWC, % | 71 | 63 | 71 | 68 | 75 | 66 | 63 | 67 | 68 | 55 |
| MODULUS, psi | 35 | 81 | 41 | 58 | 23 | 73 | 85 | 55 | 54 | 116 |
| ELONG. AT BREAK, % | 310 | 130 | 220 | 200 | 390 | 120 | 130 | 220 | 300 | 150 |
| TENSILE STR., psi | 78 | 87 | 62 | 93 | 57 | 70 | 102 | 78 | 99 | 150 |
| EXAMPLE | 16 | 17 | 18 | 19 | 20 | 21 | 22 | 23 | 24 | 25 |
| HMA % | 66.7 | 56.7 | 65.9 | 55.9 | 55.9 | 65.9 | 52.6 | 52.9 | 42.9 | 52.9 |
| HOMA % | 20 | 30 | 20 | 30 | 30 | 20 | 25 | 20 | 30 | 20 |
| SPE % | 12 | 12 | 12 | 12 | 12 | 12 | 21 | 25 | 25 | 25 |
| EGDMA % | 1.3 | 1.3 | 1.3 | 1.3 | 1.3 | 1.3 | 1 | 1.3 | 1.3 | 1.3 |
| MMA % | 0 | 0 | 0.8 | 0.8 | 0.8 | 0.8 | 0.4 | 0.8 | 0.8 | 0.8 |
| M/D | 80/20 | 80/20 | 80/20 | 80/20 | 60/40 | 60/40 | 60/40 | 80/20 | 60/40 | 60/40 |
| DILUENT | GLYC | GLYC | GLYC | GLYC | BDBAE | BDBAE | BDBAE | GLYC | BDBAE | BDBAE |
| EWC, % | 63 | 60 | 64 | 58 | 59 | 67 | 66 | 65 | 58 | 67 |
| MODULUS, psi | 74 | 84 | 66 | 112 | 69 | 42 | 43 | 72 | 100 | 56 |
| ELONG. AT BREAK, % | 160 | 340 | 180 | 140 | 250 | 180 | 290 | 140 | 190 | 190 |
| TENSILE STR., psi | 87 | 157 | 101 | 132 | 145 | 78 | 94 | 83 | 133 | 80 |

What is claimed:

1. A polymer comprising the reaction product of a hydrophilic monomer and an acyclic monomer represented by the following formula:

monomer is N-(3-sulfopropyl)-N-methacryloxyethyl-N,N-dimethylammonium betaine.

13. The polymer of claim 12 wherein the polymer further comprises the reaction product of a crosslinking agent.

14. The polymer of claim 13 wherein the crosslinking agent is ethyleneglycol dimethacrylate.

* * * * *

UNITED STATES PATENT AND TRADEMARK OFFICE
CERTIFICATE OF CORRECTION

PATENT NO. : 5,256,751

DATED : October 26, 1993

INVENTOR(S) : Vanderlaan, Douglas G.

It is certified that error appears in the above-indentified patent and that said Letters Patent is hereby corrected as shown below:

Column 8, line 17, R should be $R_1$

Column 8, line 31, 2 1 should be "2:1"

Signed and Sealed this

Twenty-fifth Day of June, 1996

Attest:

BRUCE LEHMAN

*Attesting Officer*     *Commissioner of Patents and Trademarks*